United States Patent [19]
Massey et al.

[11] 3,755,063
[45] Aug. 28, 1973

[54] THERMOFORMABLE LAMINATED STRUCTURES

[75] Inventors: David H. Massey, Glencoe, Ill.; Robert B. Anderson, Edina, Minn.

[73] Assignee: Xox Corporation, Lombard, Ill.

[22] Filed: Mar. 9, 1970

[21] Appl. No.: 17,573

Related U.S. Application Data

[63] Continuation-in-part of Ser. No. 796,738, Feb. 5, 1969, abandoned.

[52] U.S. Cl............... 161/161, 161/190, 161/254, 161/253, 161/120, 156/210, 9/6
[51] Int. Cl............... B32b 5/18, B32b 3/00
[58] Field of Search............... 161/159, 160, 161, 161/190, 254; 9/6; 156/210

[56] References Cited
UNITED STATES PATENTS

| | | | |
|---|---|---|---|
| 2,586,275 | 2/1952 | Toulmin............... | 161/159 |
| 3,041,220 | 6/1962 | Martin et al............... | 161/254 |
| 3,070,475 | 12/1962 | Carlson et al............... | 161/161 |
| 3,070,817 | 1/1963 | Kohrn et al............... | 161/254 |
| 3,174,166 | 3/1965 | Ehrenberg et al............... | 9/6 |
| 3,317,363 | 5/1967 | Weber............... | 156/210 |
| 3,429,085 | 2/1969 | Stillman............... | 161/160 |
| 3,180,778 | 4/1965 | Rinderspacher............... | 156/311 |
| 3,332,646 | 7/1967 | Kellett et al............... | 161/160 |
| 3,432,380 | 3/1969 | Weber............... | 161/161 |
| 3,503,841 | 3/1970 | Sterrett............... | 161/161 |

*Primary Examiner*—Morris Sussman
*Attorney*—Pendleton, Neuman, Williams & Anderson

[57] ABSTRACT

A thermoformable essentially rigid structural sandwich laminate of thermoplastic polymeric material having a cellular core member and a pair of exterior non-cellular skin members of thermoplastic material of normal density adhesively united to the surfaces of the core member, wherein each of the elements which form the skin and core members respectively maintain their structural integrity within the laminate in subsequent thermoforming. The cellular core member may be either a single element or may be formed of a plurality of elements or laminae each of which may be of the same or of different densities. A process of preparing the thermoformable laminate is provided which comprises adhesively uniting and adhering to the outer planar surfaces of the cellular core member, sheets of non-cellular thermoplastic material and includes the steps of adhesively uniting the several elements or laminae that make up a core member of a composite construction.

The invention also relates to a process for the manufacture of relatively rigid formed items from said laminate by thermoforming of the aforesaid laminate by the application of heat under controlled conditions followed by the application of differential pressure to said laminate, the heat being applied through the exterior non-cellular thermoplastic surfaces of the laminate to modify the thickness, density and cell structure of the cellular core member under controlled thermoforming conditions.

8 Claims, 6 Drawing Figures

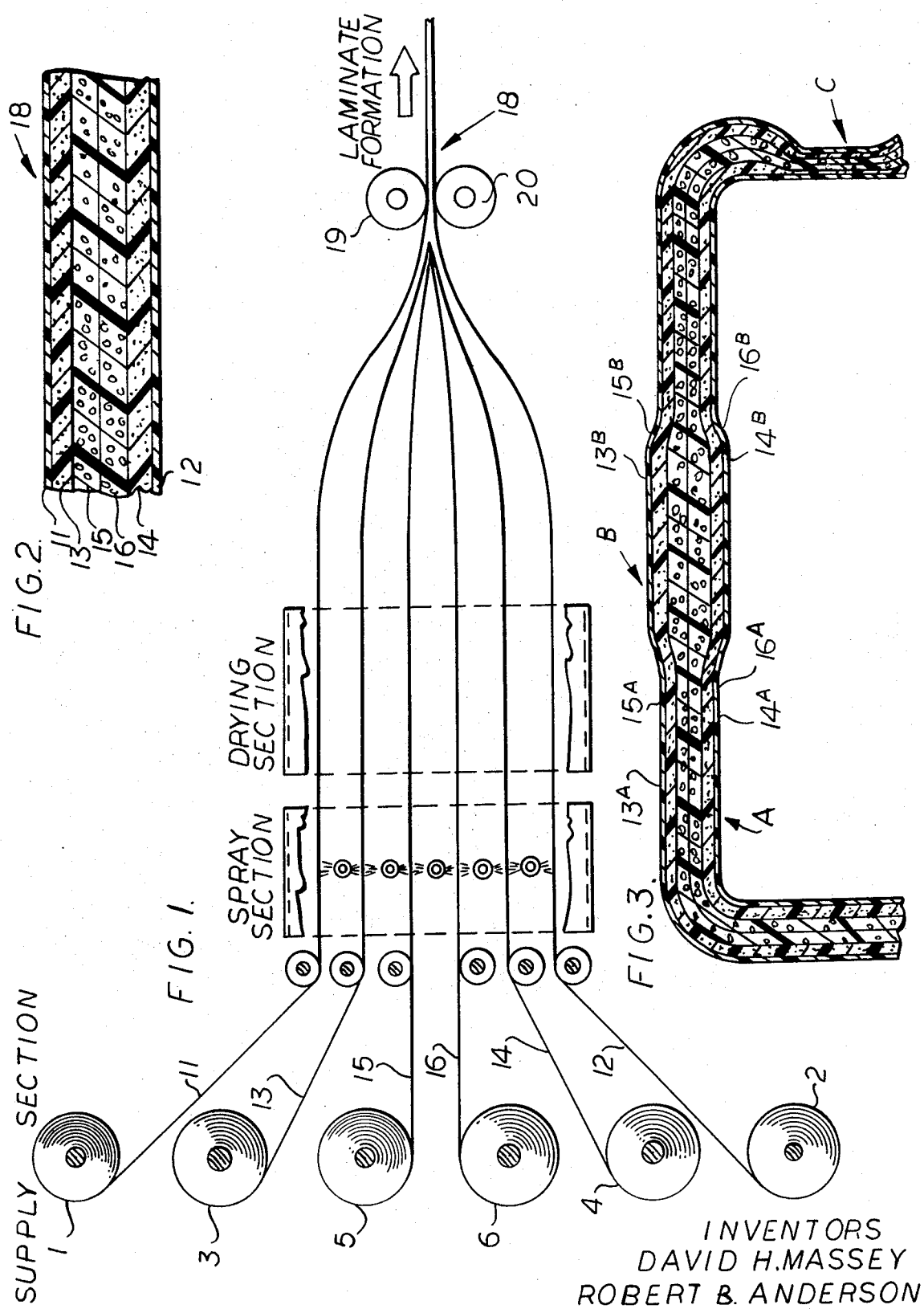

Patented Aug. 28, 1973

INVENTORS
DAVID H. MASSEY
ROBERT B. ANDERSON
BY Pendleton, Newman, Seibold & Williams
ATTY'S 3,755,063

THERMOFORMABLE LAMINATED STRUCTURES

Cross Reference to Related Application

This application is a continuation-in-part of U.S. Ser. No. 796,738 filed February 5, 1969 now abondoned.

BACKGROUND OF THE INVENTION

1. Field of the Invention

This invention relates to rigid thermoformable structural laminates in sheet form and to methods of preparing them. The laminates include non-cellular skin adhesively united to a cellular core member which may be a single cellular element or may be formed from a plurality of thermoplastic cellular sheets or elements adhesively united together. The laminate does not involve the use of chemical blowing agent or vulcanizing agents, and may be prepared without the application of heat and pressure to form the cellular core member.

The invention also relates to a process of thermoforming the laminate described above and the formation of finished goods thereby. The products so formed are characterized by low cost and improved strength in selected areas without using in situ foaming.

2. Description of the Prior Art

The formation of cellular laminates and structures by a variety of techniques is well known. Most of the rigid cellular laminates have been prepared by the in situ formation of cellular cores sandwiched between cover sheets or encasements in a mold. Chemical blowing agents or gas forming agents mixed as an integral part of the core element mix are activated by heat or otherwise in the mold. This activation or generation of gas produces a typical closed cell structure in the core element which expands to fill the configuration of the mold. The cover sheets which form the outer surface of the laminate are, of course, held in position by foaming molds and the foam expands to conform to the contours of the preformed skin. These procedures, however, are both expensive and difficult to control. Quite frequently the core element contains both blowing agents and curing agents which require extended curing cycles.

Pat. No. 3,070,817 patented Jan. 1, 1963 describes the formation of laminated elastomeric materials and the process of manufacturing a "plastic" therefrom. In this process a laminate is described which is formed from a plurality of laminae of elastomeric, vulcanizable rubbery sheets, the innermost of which contains a chemical blowing agent. The laminate is formed under heat and pressure resulting in a bonding of the laminae together by virtue of the vulcanizing agents contained therein. Due to the heat in the laminating process, the chemical blowing agent decomposes and forms a cellular core element wherein contained. The pressure of the laminating apparatus (200 p.s.i.) is such as to prevent expansion of the cellular core element during heating but on release of pressure it expands to a foam of about 15 pounds per cubic foot density. In this vulcanized laminate, the elements are rigidly vulcanized to each other (unified) and are not free to move laterally with respect to each other during subsequent thermoforming operations.

It will be noted that the nature of the process is such that structural integrity of the layers is lost during the heating or curing process since the vulcanization, in effect, cross-links the various elements of the lay-up into a single unified structure. In the final product, the result is an integrated unified laminate wherein the structural integrity of each of the components is lost and no longer identifiable as such. The fabrication of this structure obviously presents certain problems inasmuch as the cellular character of the core material is only produced after the application of heat by means of platens, autoclaves, vulcanizers or the like. The laminate must then be reheated and transferred in the hot state to the mold form representing an expensive heating routine. Furthermore, it is well known that the use of blowing agents and vulcanizing agents in conjunction inherently produces process control difficulties which are difficult to surmount.

The present invention provides a low cost process for the manufacture of essentially rigid thermoformable laminates in sheet form having a cellular plastic foam core without requiring the in situ formation of foam. The laminates of this invention are characterized in that the individual laminae maintain their structural integrity in the formation of the thermoformable laminate and in subsequent thermoforming operations to produce finished goods. The laminates are further characterized in that the laminae are free to move laterally with respect to each other while maintaining, however, the integrity of the laminate during molding or thermoforming operations. The laminates are prepared without the use of vulcanizing or cross-linking agents and have unexpectedly high physical properties especially in the area of impact resistance and flexural strength.

SUMMARY OF THE INVENTION

The present invention relates to a rigid thermoformable structural laminate construction in sheet form suitable for further processing to finished goods comprising a core member formed of cellular thermoplastic being characterized by a capacity for modification of its density and volume upon the application of heat under controlled forming conditions, and a pair of exterior skin members of non-cellular thermoplastic material of normal density adhesively united to the planar surfaces of said core member. The core member may be a single integral element but preferably comprises a plurality of laminae or plies adhesively united together. In the most preferred form the cellular elements in a multilayer or multi-component core member are of different densities. The present invention also relates to a process of forming the rigid thermoformable structural laminate which comprises adhesively uniting a pair of exterior skin sheets of non-cellular thermoplastic material of normal density to a cellular thermoplastic core member of the types described above.

The invention further relates to a process for the manufacture of relatively rigid formed items from the thermoformable laminate by thermoforming of said laminate.

The cellular core member is preferably formed of a thermoplastic material, such as, extruded oriented polystyrene, polyethylene or copolymers of styrene, acrylonitrile, butadiene, cross-linked polypropylene, or the like, and has a density of from about 3 to about 30 pounds per cubic foot, preferably from 4 to 20 pounds per cubic foot. The core and skin members may be characterized as thermoformable.

In the most preferred form of the present invention, the core member or lay-up is formed by adhesively uniting together a plurality of foamed thermoplastic sheets or elements. In one preferred form the innermost cellular core members have a density that is less than the outer cellular core members although both are cellular thermoplastic foams. Thus in one form the innermost core elements have densities of from 3 to about 10 pounds per cubic foot, and the other or outermost cellular core members have densities of from 12 to about 30 pounds per cubic foot, preferably 12 to 20 pounds per cubic foot.

The outer or exterior sheets of the laminate forming the outer skin thereof, are formed from non-cellular relatively rigid thermoplastic sheeting of normal density, such as for example, rigid vinyl or polyvinyl chloride sheeting, rigid acrylic sheeting, or rigid acrylonitrile, butadiene, styrene (ABS) sheeting, other polystyrene copolymers, polycarbonates, and acrylate-methacrylate copolymers having a density of from about 60 to 90 pounds per cubic foot and from 5 to 150 mils in thickness.

In one preferred embodiment the cellular core members contain some residual blowing agent which remains after the initial formation of the cellular sheet. Initially the sheets are formed using from 3 to 6 percent blowing agent which is capable of volatilization at extensive temperatures.

The blowing agent is preferably a non-chemical type, that is to say, one which is of the inert volatile organic fluid type which is converted to a gas at thermoforming conditions and does not rely on chemical decomposition or interaction to form a gas. When a volatile organic fluid is used there is some substantial residual solvent remaining trapped within the cells. Due to diffusion the residual volatile organic fluid remaining within the cells slowly escapes from the extruded foam structure at a rate of approximately 0.005 pounds per 100 pounds of foam per day. Ordinarily when the extruded foam stock is relatively fresh there is no necessity to take this factor into account but it should, however, be understood that after a substantial period of time, i.e., 30 days or more, the residual volatile organic fluid within the cells has been sufficiently depleted so that very little residual cell expanding capability attributable to the fluid per se is left. The preferred blowing agent which are used in forming the cellular structures are gases at normal atmospheric pressure. Those thermoplastic cellular materials of very low density have a higher capacity for expansion upon heating to the softening stage by virtue of the fact that they contain a greater percentage of trapped gas, air, or volatile organic fluid within the thermoplastic matrix. In those instances where the cellular material contains some residual organic fluid blowing agent additional expansion and concomitant reduction of density on heating is possible by virtue of the fact that the blowing agent is converted from the liquid state to the gaseous state.

It should also be recognized that in any thermoforming processes which necessarily involve a further heating of the laminate of the present invention, excessive heating or heating under uncontrolled pressure conditions will result in over-expansion of the foam cells, rupture of the cell walls, followed by the collapse of the cells to produce a product of higher density and when taken to the logical extreme will result in a product which reaches the limiting value of the density of the polymeric thermoplastic material in its normal, non-cellular state.

It has also been found that in the heating of the multi-element core laminates of this invention in the thermoforming operation where the heat is principally in the radiant form is transferred from or through the outer surfaces, there is a tendency for the composite cellular core and exterior non-cellular skin laminae to progressively rise in temperature so that the outermost surfaces attain the higher temperatures and the innermost core elements or laminae are progressively lower in temperature. Even with this lower temperature the less dense innermost cellular elements are the most responsive to temperature and therefore expand at a higher rate, whereas the outermost cellular elements may, depending upon the temperature and pressure conditions of forming, decrease in density at a lower rate.

The organic fluid blowing agents used in forming the laminae of the present invention are pentane or similar C-5 hydrocarbons and materials which have a similar volatilization temperature range, such as, Freon 112 and Freon 114 or mixtures of any of these materials. The extruded foam products used in forming the core members in the preferred aspects of the present invention are of the closed cell type and range in thickness from about 30 to 150 mils (0.030 to 0.150 inch). They have cell sizes averaging from about 1/64 inch at the high end of the range down to 1/3,000 inch at the smaller end of the range.

It should, however, be understood that cellular material which contains no blowing agent has the capacity upon heating of substantial further expansion by virtue of the entrapped air. While reference is made in this context to expansion of the cellular foam material, it should be recognized that under particular forming techniques an increase in density in selected areas of a formed part can be achieved. This provides certain additional puncture resistance and compressive strength properties in these selected areas. In those selected areas where there is an increase in density of the cellular component, the cellular character is sharply reduced.

Thus in a molding or thermoforming situation a laminate as a whole, prepared in accordance with the present invention, is heated from the exterior skin surfaces and has a tendency to expand. The mold or forming structure disposed around the heated laminate will have a tendency to compress some sections of the laminate and in other areas permit the laminate to expand to conform to the walls or surface of the molding form. The ultimate result is a final molded product which, although generally sheet-like in character, may in some instances, contain thinner portions and in some cases thicker portions. The terms "thinner" and "thicker" as used herein are meant to refer to the norm of the general thickness of the sheet as it is processed. In the normal planar area which represents the major proportion of the formed sheet, there may be a material density gradient in the core member from adjacent the exterior skin surfaces to the innermost core elements. The least dense portion will ordinarily be the most interior of the cellular core elements. The core elements that are disposed between the most interior of the core elements and the exterior skin surfaces will generally be of somewhat higher density and the outer non-cellular skin or exterior laminae elements will be, of course, of normal density since they were non-cellular in the first instance. In those portions of the laminate which are of reduced thickness by virtue of the configuration of the mold, a similar density gradient pattern may exist in the core. However, the core portion of the laminate that is thin in cross-section will normally be higher in density on an overall basis than the adjacent portions of the laminate which are of normal thickness.

Conversely in those portions of the laminate where the mold conformations are such as to permit the laminate to expand above the average thickness dimension of the thermoformed sheet, the sheet will have overall reduced densities in the immediate area of the expanded portion. It should be understood that all the elements of the laminate of the present invention maintain their structural integrity during thermoforming notwithstanding the process or mold that is utilized in the formation of the product.

The adhesive which is used in uniting the various elements of the laminate is preferably an elastomeric, rubbery contact type adhesive, i.e., one which is self adhering. Preferably the adhesive is solvent based although aqueous base or emulsion type adhesives may be used. The elastomeric material used in the adhesive should be compatible with the foam cores and skin materials. Neoprene or polychloroprenes having a molecular weight in the area of 5,000 are preferred. The resin used in the adhesive is preferably of the terpene phenolic or butylated phenolic type. When solvent based, the solvents are preferably predominantly aliphatic and contain some ketones such as acetone and methylethyl ketone. It should be understood that the solvent formulation should be such as will not attack the foam of the core sheet causing collapse. The nature of the adhesive is such that when dry it possesses enough plasticity to soften and flow when heated in the thermoforming step to permit the plies or laminae to shift or slip past each other as especially may be noted in the areas of the final product where a curved or thick section is encountered. The solids content in the solvent based adhesive is preferably 22 to 24 percent.

BRIEF DESCRIPTION OF THE DRAWING

For a more complete understanding of the present invention, reference is made to the drawings, wherein:

FIG. 1 is a schematic illustration of a method for forming the laminate of the present invention;

FIG. 2 is a representative enlarged fragmentary cross-section of a laminate formed from the process utilizing the system of FIG. 1; and FIG. 3 is an enlarged cross-sectional view of a portion of a structure formed through a thermoforming process utilizing the laminate of the present invention.

Figure 5:
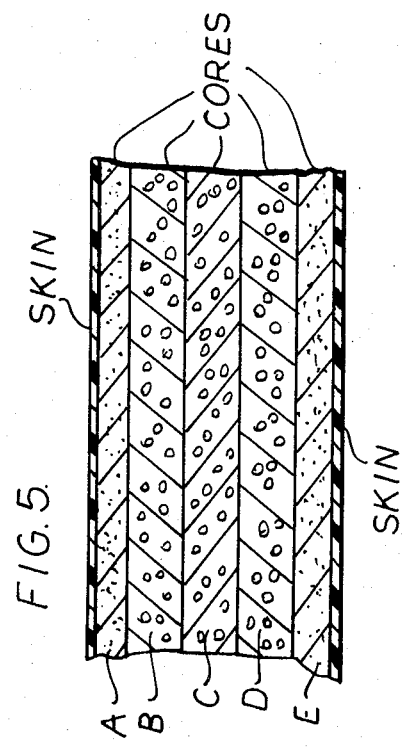
FIGS. 4, 5 & 6 are fragmentary cross-sectional views of other embodiments of laminates of the present invention.

In accordance with the accompanying drawings the schematic illustration of FIG. 1 shows a laminating method or process which may be employed to produce the laminate of applicant's invention. In the illustrated process a pair of outer skins or surface laminate in sheet form are provided from supply rolls 1 and 2 which layers are sheets of non-cellular relatively rigid polymeric material of normal density designated 11 and 12. Four rolls of cellular core material, 3, 4, 5 and 6, are provided to supply the core material laminae designated 13, 14, 15 and 16, to be sandwiched between the exterior skins. The rolls designated 3 and 4 supply extruded cellular thermoplastic material of predetermined density in sheet form (13 and 14) such as polystyrene. Interior rolls 5 and 6 also provide cellular thermoplastic core elements (15 and 16) which may also be cellular polystyrene in sheet form of predetermined density. The density of the sheets 15 and 16 may be lower than that of sheets 13 and 14. The laminae 11 through 16 from rolls 1 to 6 are delivered into a common laminating zone to provide lamination into the sheet material or laminate which is designated 18.

As illustrated in FIG. 1, the sheet 11 through 16 are passed through an adhesive spraying section for the application of a layer of adhesive thereto. This adhesive is a self-adhering pressure contact type in a carrier such as a solvent. Adhesive is applied to the planar surfaces of the laminae with the exception, of course, of the outer surface of skin members 11 and 16. Solvent or carrier in the adhesive is removed by evaporation by passing the coated sheets through a drying section. After drying, the sheets are joined and pressure rolls 19 and 20 are employed to contact the self-adhering adhesive surfaces together with pressure to bond the sheets and form the laminate. The adhesive applied to the surfaces of the several laminae 11 through 16 forms a mechanical bond therebetween to adhere these surfaces together.

The lamination operation is also illustrated in FIG. 1 and the formed laminate may either be cut to desired lengths and stored or may be cut and immediately formed in a thermoforming process.

A prime prerequisite of this particular pressure sensitive contacting adhesive is that the adhesive remains sufficiently flexible through the thermoforming temperature ranges and that the adhesive will form and provide a proper bond at all temperature ranges while not adversely affecting the particular characteristics of the material of the individual layers as they are subjected to the various loads applied to the formed or unformed panels.

In the form shown the material forming the individual laminates may be of similar or dissimilar materials but it has been found that the core material laminae designated 13, 14, 15 and 16, should be and should include what are known in the art as expandable substances. These substances may include expandable polystyrene, expandable ABS or the like, with the primary requisite being that the material has gone through a controlled expansion and extruding process whereby a sheet of predetermined density has been provided and which may be further expanded upon the application of heat thereto.

As illustrated in FIG. 1, a plurality of core layers or laminae include two layers of cellular thermoplastic material 13 and 14, adjacent the exterior skin material and two layers of cellular thermoplastic material 15 and 16 which latter may be less dense than elements 13 and 14. The process shown herein illustrates that in one preferred form, the final laminated structure comprises a plurality of elements wherein the core member is a plurality of cellular thermoplastic elements which may be of different densities. The core member is bounded by exterior laminae or skins which may be of the same material as the core or may be dissimilar, but in any event have a density higher than the core layers.

It is necessary in this invention to provide a laminate which is thermoplastic and which will, upon application of heat thereto, undergo deformation. The deformation characteristics of the individual material will, of course, depend upon the densities as well as softening or distortion temperature.

FIG. 2 represents a fragmentary cross-section of a typical laminate 18 prepared in accordance with the invention after it passes through the nip of rolls 19 and 20. The following table describes typical examples of laminates prepared in accordance with this invention.

in the thermoforming operation. Here elements identified as 13c, 14c, 15c and 16c are compressed to thinner sections and greater densities then the sector designated A.

FIG. 3 is intended to depict the variety of forms which can be made using the process and product of the instant invention. It will be noted that the selective

TABLE OF EXAMPLES

| Example | I | II | III | IV | V | VI | VII | VIII | IX |
|---|---|---|---|---|---|---|---|---|---|
| Top Skin: | | | | | | | | | |
| Material | ABS | ABS | ABS | ABS | ABS | ABS | PVC | APVC | PC |
| Thickness | 80 | 40 | 50 | 60 | 50 | 60 | 15 | 40 | 150 |
| Bottom Skin: | | | | | | | | | |
| Material | ABS | ABS | PS | ABS | ABS | ABS | PVC | PVC | PVC |
| Thickness | 40 | 40 | 50 | 60 | 50 | 60 | 15 | 70 | 20 |
| Cellular core elements: | | | | | | | | | |
| A: | | | | | | | | | |
| Material | PS | PS | PS | PS | PS | PS | PS | PS | PP |
| Thickness | 100 | 100 | 100 | 100 | 100 | 100 | 100 | 100 | 200 |
| Density | 18 | 18 | 20 | 20 | 20 | 20 | 20 | 18 | 4 |
| B: | | | | | | | | | |
| Material | PS | PS | PS | PS | PS | PS | PS | PP | |
| Thickness | 100 | 100 | 100 | 100 | 100 | 100 | 100 | 200 | |
| Density | 6 | 6 | 9 | 20 | 20 | 20 | 20 | 4 | |
| C: | | | | | | | | | |
| Material | PS | PS | PS | PS | PS | | | PS | |
| Thickness | 100 | 100 | 100 | 100 | 100 | | | 100 | |
| Density | 6 | 6 | 9 | 20 | 9 | | | 18 | |
| D: | | | | | | | | | |
| Material | PS | PS | PS | PS | PS | | | | |
| Thickness | 100 | 100 | 100 | 100 | 100 | | | | |
| Density | 18 | 18 | 9 | 20 | 9 | | | | |
| E: | | | | | | | | | |
| Material | | | | PS | PS | | | | |
| Thickness | | | | 100 | 100 | | | | |
| Density | | | | 20 | 20 | | | | |
| F: | | | | | | | | | |
| Material | | | | | PS | | | | |
| Thickness | | | | | 100 | | | | |
| Density | | | | | 20 | | | | |

Abbreviations: ABS=acrylonitrile, butadiene, styrene copolymer; PS=polystyrene; PVC=polyvinyl chloride; PP=polypropylene; APVC=acrylic/polyvinyl chloride alloy; PC=polycarbonate.

The laminate formed by adhesively uniting the various laminae at pressure rolls 18 and 19 is subjected to thermoforming using conventional thermoforming apparatus, particularly vacuum forming equipment. The laminate is heated to raise the core elements to the distortion or softening temperature which in the case of polystyrene foams ranges from about 160° to 295°F., preferably 170° to 190°F., after which it is subjected to thermoforming operations such as vacuum forming. In the case of polypropylene foam cores, the softening point is somewhat higher, in the range of 212°F.

FIG. 3 illustrates a typical molded sheet subjected to a thermoforming operation, i.e., vacuum forming. In the area designated A, the drawing shows the cross-section of the expanded elements 13a, 14a, 15a and 16a. These cellular foamed sheets, polystyrene in this particular instance, have been expanded in the range of 1.5 to 5, preferably 2 to 3 times their original volume. The central cores 15 and 16 were initially about 100 mil (0.100 inch) thick and had a density of about 10 pounds per cubic foot and after expansion (15a and 16a) had a density of about 5 pounds per cubic foot. The outer cellular cores 13 and 14 were initially about 100 mil thick and had a density of about 20 pounds per cubic foot (PCF) and after expansion had a density of about 10 PCF. Their thickness, of course, increased substantially.

The area of FIG. 3 designated B shows a cross-section of a thermoformed piece where the mold contours were such that additional expansion occurred resulting in increased thickness. It is to be noted that core elements 15b and 16b have expanded substantially more than the core elements 13b and 14b.

The area designated C in FIG. 3 shows compression localized expansion capability of the thermoplastic core elements especially in areas such as B, illustrates that self-reinforcing elements may be incorporated into the sheet structure at the same time that it is thermoformed.

The conditions for thermoforming using a vacuum mold have been discussed above. The laminate of Example I was used to form a camper top employing a Comet Rotary Machine. The heating conditions were 23 percent of input on the top heater and 57 percent of input on the bottom heater for 105 seconds. Preheating was used with the laminate of Examples III to VII. With Example V the preheat oven heaters were operated at 9 and 18 percent of full input for 255 seconds. The final heat oven was operated at input rates of 17 percent (top heater) and 34 percent (bottom) for 255 seconds. A Comet four stage Rotary Machine with two stage heating was used in these examples.

The laminates of the present invention are unexpectedly superior to those known in the art. For example, a laminate prepared in accordance with the present invention having skin elements of 60 mil ABS sheet and a core member comprised of two outer core sheets of 80 mil polystyrene foam having a density of 18 PCF and three inner core sheets of 100 mil polystyrene foam having a density of 5 PCF.

This laminate was compared with a conventional rigid polyurethane foam laminate having a ½ inch overall thick polyurethane core with a density of 6 PCF having been foamed in situ between 60 mil ABS sheeting. The laminate of this invention had a flexural fail point on beam loading, 14.5 inch span with a center load of 192 pounds at 1.75 inch deflection as compared to the urethane laminate which had a fail point of 156 pounds at a 1.9 inch deflection, which give fail load/deflection ratios of 82 and 109 respectively. A comparison of impact resistance also showed unexpected superiority. Thus the laminate of this invention had an impact strength (using a ½ inch falling dart ram) of 16 foot pounds to rupture compared with 6 foot pounds for the above described urethane foam laminate.

Figure 6:
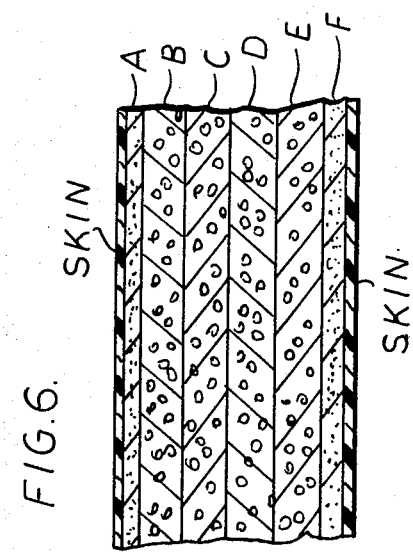

In the embodiments of this invention which comprise a laminate as described in Examples I, II, III and V, and illustrated in FIGS. 2 and 6 of the drawing, it has been found that it is possible to utilize low cost, very low initial density central core members which are highly responsive to heat during thermoforming and have the capacity of substantial expansion, if these low density central core elements are surrounded by more heat resistant laminae adjacent the skin elements. These intermediate laminae have heat buffering properties in that they impede the transfer of heat from the skins to the innermost core to the end that the skins are at the proper thermoforming temperature but the low density innermost cores are protected from undue transfer of heat and excessive temperatures which could result in collapse of the cell structure. The structure referred to in the preceeding is characterized by thinner skin portions and a lower overall core density while maintaining greater strength properties than could be achieved if core elements of uniform density or strength were used. This obviously provides a more economic product because of the relatively superior ratio of performance to weight.

Figure 4:
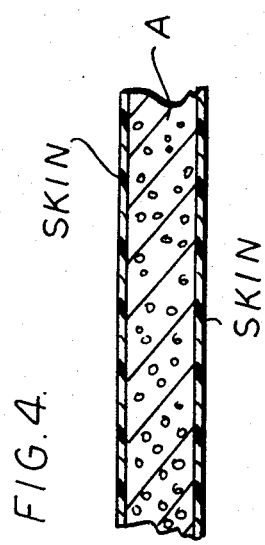

In FIGS. 4, 5 and 6, there are illustrated in fragmentary enlarged cross-section, various embodiments of the invention such as are shown in the drawings. The cores are designated by the letters A through F such as is the designation of the various examples.

What is claimed is:

1. An essentially rigid thermoformable structural laminate of thermoplastic polymeric material in sheet form and suitable for thermoforming to finished goods, said laminate comprising:
   a. a core member formed from a plurality of closed cell thermoplastic, extruded, partially expanded and relatively thin foam sheet elements adhesively united together with a heat deformable, elastomeric adhesive,
   b. the foam sheet core elements being made from a polymeric material selected from the group consisting of polystyrene, polypropylene, polyethylene and copolymers of styrene, butadiene and acrylonitrile,
   c. A pair of exterior skin sheets of non-cellulsr thermoplastic polymeric material selected from the group consisting of, polyvinyl chloride, acrylic polymers, copolymers of acrylonitrile, butadiene and styrene (ABS), polycarbonates, polystyrene copolymers and acrylate-methacrylate copolymers, the material being of normal density adhesively united to the surface of the core member with a heat deformable elastomeric adhesive,
   d. the laminate having a first state and configuration wherein the core sheets are parallel thin sheets of uniform thickness, and
   e. the laminate having a second state and configuration after application of heat in a subsequent thermoforming operation wherein the exterior skin sheets retain their original thickness but the foam sheet elements expand and produce portions which are substantially thicker than in the first state, said laminate being further characterized as maintaining its structural integrity as a laminate while each of the adhesively united laminae maintain their individual structural integrity under load stress and are capable of lateral movement with respect to each other during thermoforming.

2. A laminate according to claim 1 wherein the skin member is a non-cellular thermoplastic sheet having a density of from about 60 to 90 pounds per cubic foot.

3. A laminate according to claim 1 wherein the skin member has a thickness of from about 5 to 150 mils.

4. A laminate according to claim 1 wherein the skin member is polyvinylchloride resin.

5. A laminate according to claim 1 wherein the cellular core elements have a density of from about 3 to about 30 pounds per cubic foot.

6. A laminate according to claim 1 wherein the core comprises a plurality of elements each having a thickness of from about 30 to 150 mils.

7. A laminate according to claim 1 wherein the skin member is a non-cellular thermoplastic sheet having a density of from about 60 to 90 pounds per cubic foot and a thickness of from about 5 to 150 mils.

8. A laminate according to claim 1 wherein the core elements are arranged with the least dense core element or elements in the central portion of the core member.

* * * * *

UNITED STATES PATENT OFFICE
CERTIFICATE OF CORRECTION

Patent No. 3,755,063            Dated August 28, 1973

Inventor(s) David H. Massey and Robert B. Anderson

It is certified that error appears in the above-identified patent and that said Letters Patent are hereby corrected as shown below:

| | | |
|---|---|---|
| Col. 1, l. 5 | - | "abondoned" should be "abandoned" |
| Col. 1, l. 45 | - | After "plastic" insert -- boat -- |
| Col. 6, l. 9 | - | "sheet" should be "sheets" |
| Col. 7, l. 4 | - | "the" should be "this" |
| Col. 10, l. 3 Claim 1 | - | "non-cellulsr" should be "non-cellular" |

Signed and sealed this 19th day of March 1974.

(SEAL)
Attest:

EDWARD M. FLETCHER, JR.
Attesting Officer

C. MARSHALL DANN
Commissioner of Patents